(12) United States Patent
Suda

(10) Patent No.: US 6,473,127 B1
(45) Date of Patent: *Oct. 29, 2002

(54) IMAGE PICKUP APPARATUS

(75) Inventor: Hirofumi Suda, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/621,943

(22) Filed: Mar. 26, 1996

(30) Foreign Application Priority Data

Mar. 27, 1995 (JP) .............................. 7-068364

(51) Int. Cl.⁷ .......................... H04N 5/232; H04N 5/235
(52) U.S. Cl. ....................................... 348/350; 348/362
(58) Field of Search ................................ 348/333, 334, 348/350, 345, 362, 333.03, 333.04, 333.02, 364, 346, 349, 352

(56) References Cited

U.S. PATENT DOCUMENTS

| | | | | |
|---|---|---|---|---|
| 5,040,072 A | * | 8/1991 | Tsuji et al. | 348/333 |
| 5,051,833 A | * | 9/1991 | Tsuji | 358/227 |
| 5,060,074 A | * | 10/1991 | Kinugasa et al. | 348/333 |
| 5,161,025 A | * | 11/1992 | Nakao | 348/333 |
| 5,349,415 A | * | 9/1994 | Nishida | 354/432 |
| 5,541,655 A | * | 7/1996 | Kaneda | 348/333 |
| 5,570,156 A | * | 10/1996 | Arai et al. | 348/334 |
| 5,694,168 A | * | 12/1997 | Toji | 348/350 |
| 6,088,060 A | * | 6/2000 | Suda et al. | 348/350 |

FOREIGN PATENT DOCUMENTS

JP 4154165 5/1992 .......... H04N/1/028

* cited by examiner

Primary Examiner—Tuan Ho
(74) Attorney, Agent, or Firm—Fitzpatrick, Cella, Harper & Scinto

(57) ABSTRACT

A video camera includes a viewpoint detector for detecting the viewpoint of an operator in a photographing screen, a frame setting circuit for independently setting AF and AE frames to have the viewpoint position in the screen detected by the viewpoint detector as the central position, a focus detection circuit for performing focus detection on the basis of an image signal component corresponding to a portion within the AF frame set by the frame setting circuit, a photometry circuit for performing a photometry operation in accordance with an image signal component corresponding to a portion within the AE frame, and a control circuit for controlling the AF and AE frames so that they do not fall outside the screen.

26 Claims, 7 Drawing Sheets

IMAGE PICKUP APPARATUS

BACKGROUND OF THE INVENTION

1. Field of the Invention

The present invention relates to an image pickup apparatus which designates a position and an area in the image pickup screen and performs a focus detection or photometry operation on the basis of the designated position and area.

2. Related Background Art

In the field of commercial image pickup apparatuses represented by video built-in type cameras, various efforts have been made to obtain a high-quality image more easily. Auto-focus (AF) and automatic exposure adjustment (AE) mechanisms equipped as standard functions at present are used for eliminating troublesome operations for adjusting the focusing and exposure states in every photographing operation, and are typical examples of the functions that can attain the object of easily obtaining a good image.

Since-the camera or the like uses these AF and AE mechanisms to "automatically" determine the photographing condition and to adjust the lens position and iris to an exposure state which may be suitable for the determined condition, the photographer's will may not often be reflected in the photographed image. For example, when both a far object and a near object are present in the photographing screen, if an AF operation is executed on the basis of information of the entire photographing screen, one of these objects is set in an in-focus state, but the camera cannot determine if the object set in the in-focus state is a principal object on which the photographer wants to focus. When an image of a principal object is photographed with the blue sky as a background, if an AE operation is executed based on information of the entire screen, the principal object image becomes undesirably dark since the AE function adjusts the iris in correspondence with the brightness of the sky.

In order to avoid such a situation, conventionally, it is a general practice to preponderantly perform the distance measurement and photometry operations for an object located at the center of the photographing screen, and to execute the AF and AE operations based on these results. This technique is based on the fact that the photographer often sets a principal object at the center of the screen in a photographing operation. However, this method suffers a drawback that when the principal object is set at a position other than the center of the screen, the focusing and exposure states cannot be adequately adjusted with respect to the principal object.

In view of this problem, the present applicant proposed a photographing apparatus which selects a principal object on the basis of the viewpoint of the photographer who is looking into the finder so as to obtain optimal focusing and exposure states independently of the position of the principal object in the photographing screen (Japanese Patent Application Laid-Open No. 4-154165). According to this photographing apparatus, the position of the principal object can be freely changed while limiting the AF and AE. In this case, a position designation means for selecting the principal object is not limited to a means for detecting the viewpoint. For example, a means such as a joystick, a mouse, or the like, which determines the moving direction and position by synthesizing moving amounts on two axes, may be used instead.

When one of the former center fixing method and the latter viewpoint position limiting method may be selected using, e.g., a switch in correspondence with the photographing methods (e.g., the photographer looks into or does not look into the finder), each of the photographing methods may be covered.

However, in the above-mentioned example, since a display frame displayed on the screen to designate a position in the screen, an AF area, and an AE area are set using a common area, if these areas are set to optimize the focus adjustment, such areas are not optimal to photometry; and vice versa. Therefore, it is difficult to set optimal areas.

SUMMARY OF THE INVENTION

It is an object of the present invention to provide an image pickup apparatus which can solve the above-mentioned problems and can optimally perform both photometry and distance measurement operations.

In order to achieve the above object, according to a preferred embodiment of the present invention, there is disclosed an image pickup apparatus comprising position designation means for designating a position in a screen within which image pickup means performs an image pickup operation, photometry gate means for determining a photometric detection area in the screen in correspondence with the position information designated by the position designation means, and extracting a signal corresponding to the photometric detection area from a video signal obtained from the image pickup means, and focus gate means for determining a focus detection area in the screen in correspondence with the position information designated by the position designation means independently of the photometric detection area, and extracting a signal corresponding to the focus detection area from the video signal obtained from the image pickup means.

It is another object of the present invention to provide an image pickup apparatus wherein when the position designation means designates a desired principal object in the photographing screen, the photometry gate means and the focus gate means respectively determine a photometric detection area and a focus detection area in correspondence with the designated position, and respectively extract their evaluation values from a video signal in correspondence with the determined areas, and the apparatus performs AE and AF control operations on the basis of the outputs from these gate means so as to optimally control the AE and AF operations.

Other objects and features of the present invention will become apparent from the following description of the specification taken in conjunction with the accompanying drawings.

DETAILED DESCRIPTION OF THE PREFERRED EMBODIMENTS

The preferred embodiments of an image pickup apparatus according to the present invention will be described hereinafter with reference to the accompanying drawings.

Figure 1:
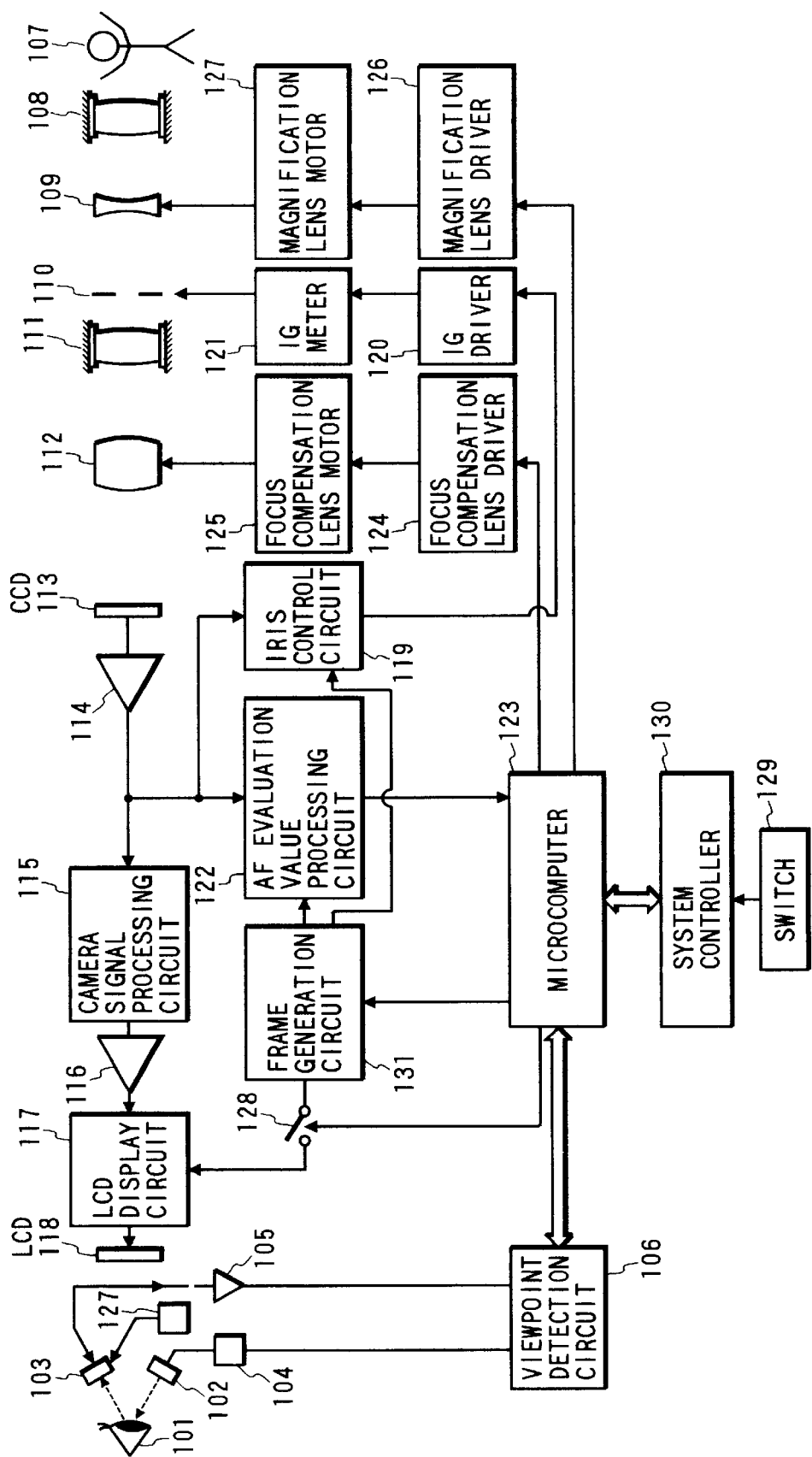
FIG. 1 is a block diagram showing the first embodiment of the present invention.
Figure 2:
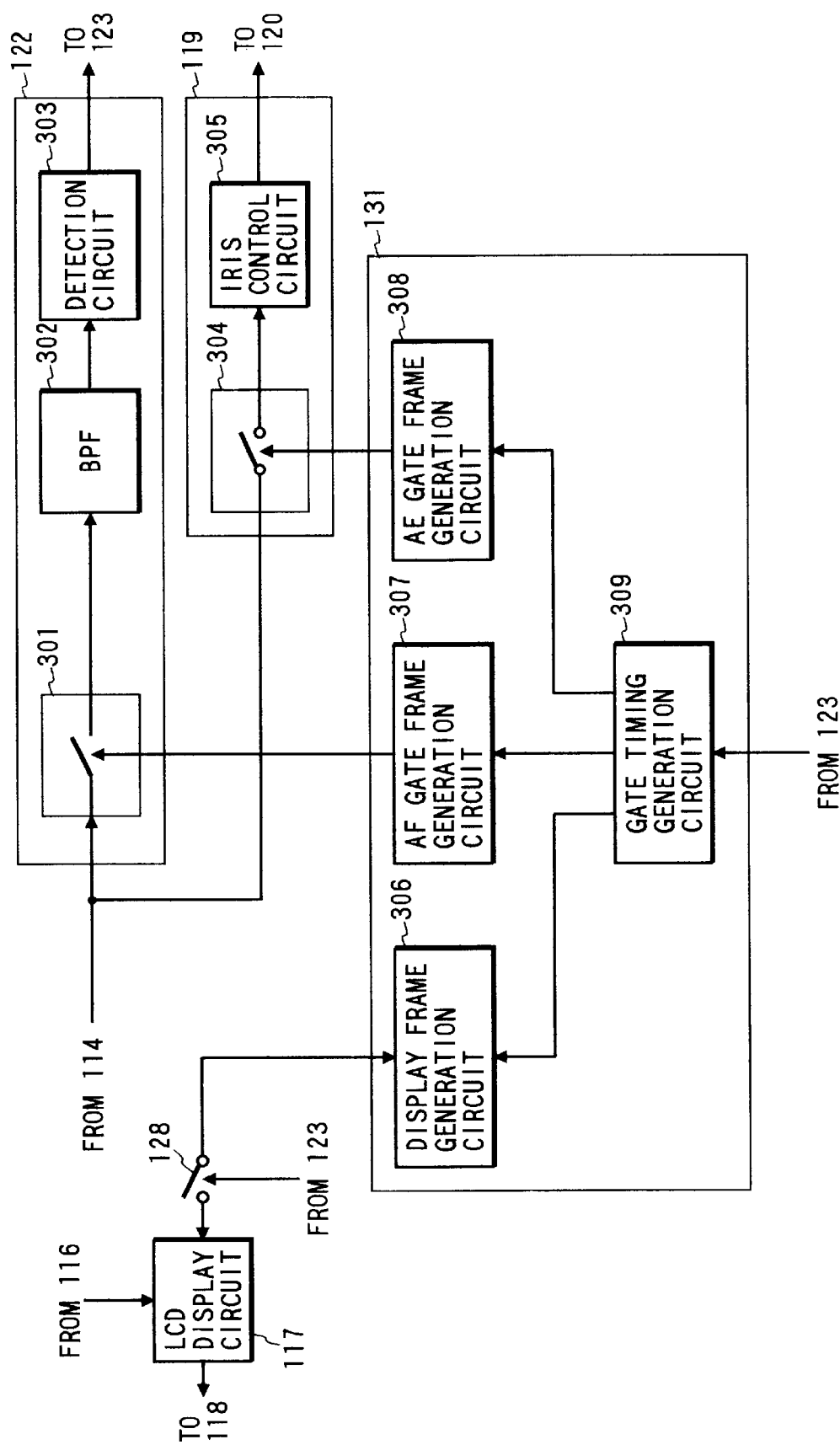
FIG. 2 is a block diagram showing the arrangement of a frame generation circuit 131, an AF evaluation value processing circuit 122, and an iris control circuit 119 shown in FIG. 1.

FIG. 1 is a block diagram showing the arrangement according to the first embodiment of the present invention, and FIG. 2 is a block diagram showing in more detail a frame generation circuit 131, an AF evaluation value processing circuit 122, and an iris control circuit 119 shown in FIG. 1.

Referring to FIG. 1, light reflected by an object 107 is imaged on the image pickup surface of an image pickup element 113 such as a CCD via an inner focus type lens unit including a stationary first group lens 108, a magnification lens 109, an iris 110, a stationary third group lens 111, and a focus compensation lens 112, and is converted into an electrical signal. The electrical signal is output from the element 113 as a video signal. The video signal is amplified to an optimal level by an amplifier 114, and the amplified video signal is input to a camera signal processing circuit 115 to generate a luminance signal and chrominance signals, i.e., a standard television signal. Also, the video signal is input to the AF evaluation value processing circuit 122 and the iris control circuit 119. The standard television signal generated by the camera signal processing circuit 115 is amplified by an amplifier 116, and the amplified signal is input to an LCD display circuit 117. The input signal is displayed on an electronic viewfinder 118 comprising, e.g., a liquid crystal display.

The AF evaluation value processing circuit 122 extracts high-frequency components that change in correspondence with the degree of focusing from video signal components corresponding to a portion in an AF gate frame set in the screen, and generates an AF evaluation value using the peak value, integrated value, or the like of the extracted components. The circuit 122 then supplies the evaluation value to a microcomputer 123.

The iris control circuit 119 detects the average luminance level of video signal components corresponding to a portion in a photometric (AE) gate frame set in the screen, and compares the average level with a reference level to open/close-control the iris 110 via an IG driver 120 and an IG meter 121, so that the two levels become equal to each other.

The microcomputer 123 outputs a frame generation instruction to a frame generation circuit 131 in accordance with position information in the screen from a viewpoint detection circuit 106 (to be described later). The frame generation circuit 131 generates a display frame using a display frame generation circuit 306 (FIG. 2) in accordance with the instruction from the microcomputer 123, changes the ON/OFF state of a switch 128, and then supplies the display frame to the LCD display circuit 117. On the other hand, the frame generation circuit 131 generates an AF gate frame using an AF gate frame generation circuit 307 (FIG. 2), and outputs it to the AF evaluation value processing circuit 122. Furthermore, the circuit 131 generates an AE gate frame using an AE gate frame generation circuit 308 (FIG. 2), and outputs the AE gate frame to the iris control circuit 119. A gate timing generation circuit 309 generates timing signals for generating the above-mentioned frames in accordance with an instruction. from the microcomputer 123.

The LCD display circuit 117 displays the display frame on the electronic viewfinder to be superposed on the standard television signal.

FIG. 2 is a block diagram showing the arrangement for generating the AF and AE gate frames. The AF evaluation value processing circuit 122 extracts only signal components corresponding to the AF gate frame from the video signal supplied from the amplifier 114 using a switch 301, and extracts only high-frequency components that change in correspondence with the degree of focusing using a band-pass filter 302, as described above. Then, the circuit 122 converts the extracted high-frequency components into DC components using a detection circuit 303 to obtain an AF evaluation value. The circuit 122 supplies the evaluation value to the microcomputer 123. The microcomputer 123 outputs a focus lens control signal to a focus compensation lens driver 124 on the basis of the received AF evaluation value. The control signal is converted into a motor driving signal by the driver 124, and the converted signal drives a focus compensation lens motor 125. Thus, the focus compensation lens 112 is driven in the optical axis direction to adjust the focusing state.

On the other hand, a magnification control signal from the microcomputer 123 is converted into a motor driving signal by a magnification lens driver 126, and the converted signal drives a magnification lens motor 127. Thus, the magnification lens 109 is driven in the optical axis direction to control the focal length, thereby attaining a magnification operation.

Signal components corresponding to the AE gate frame are extracted from the video signal by a switch 304 in the iris control circuit 119, and are subjected to signal processing by an iris control circuit 305 to obtain an iris control signal. The iris control signal is converted into an IG driving signal by the IG driver 120, and the IG driving signal drives the IG meter 121 to open/close the iris 110, thus controlling the exposure amount.

Figure 3:
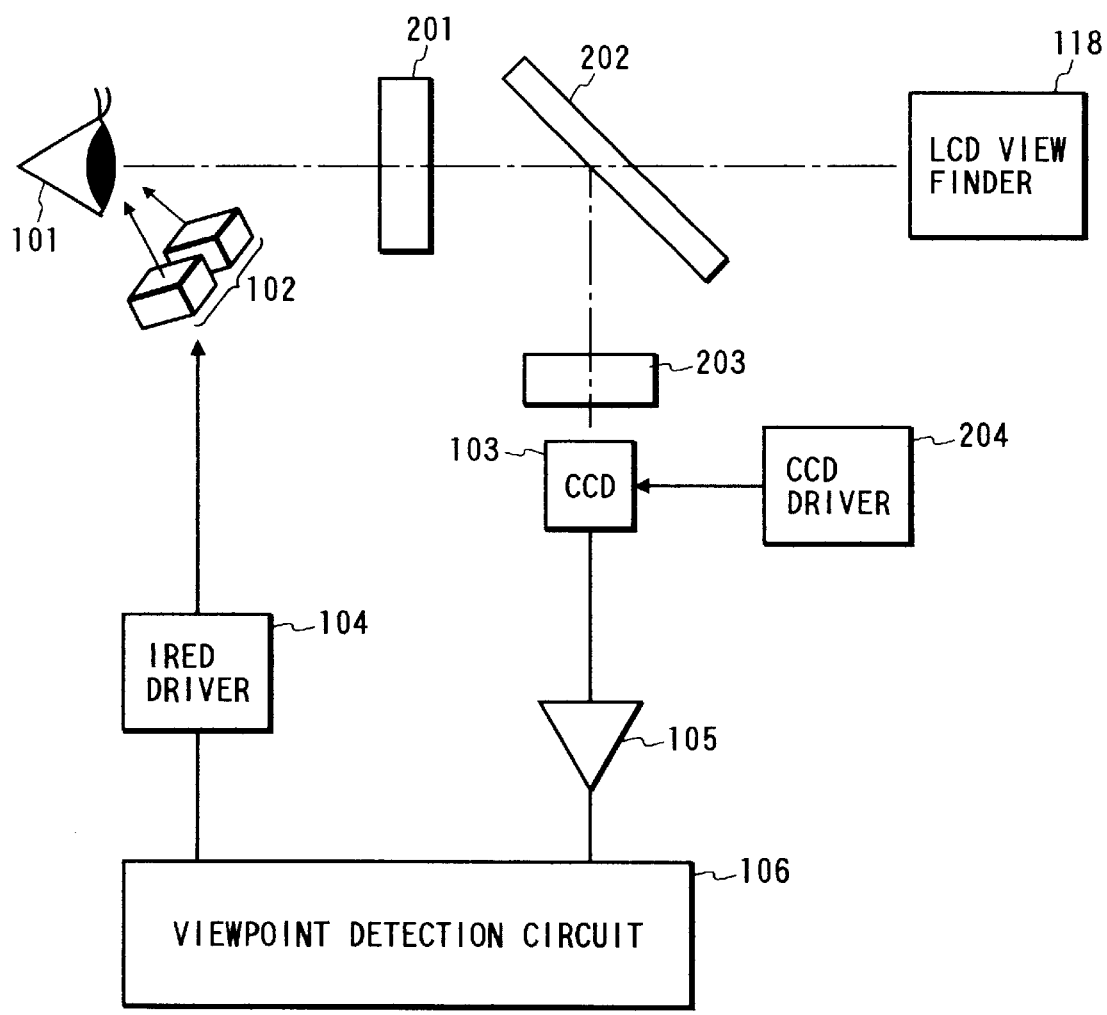
FIG. 3 is a diagram for explaining the viewpoint input operation according to the first embodiment of the present invention.

Viewpoint detection processing for detecting the viewpoint position of an operator who is looking into the LCD viewfinder screen will be described below with reference to FIG. 3.

An eye 101 of a photographer observes an image displayed on the electronic viewfinder 118 in an enlarged scale via an eyepiece lens 201, and is illuminated with light emitted by two infrared diodes (IREDs) 102 which emit infrared rays via an IRED driver 104 under the control of a viewpoint detection circuit 106. The image (eyeball image) of the eye 101 illuminated with the light emitted by the IREDs 102 is reflected by a dichroic mirror 202 via the eyepiece lens 201, and is focused by an imaging lens 203 to form an image on an image sensor 103. The eyeball image formed on the image sensor 103 is photoelectrically converted into an electrical signal by the image sensor 103 driven by a CCD driver 204, and the electrical signal is amplified by an amplifier 105. The amplified signal is input to the viewpoint detection circuit 106. The viewpoint detection circuit 106 detects the viewpoint position of the photographer in the viewfinder on the basis of the eyeball image, and outputs the detected position to the microcomputer 123 as position information in the screen. Whether or not this viewpoint detection is performed is selected using a switch 129 shown in FIG. 1, and the selected mode is sent to the microcomputer 123 via a system controller 130.

Figure 4A:
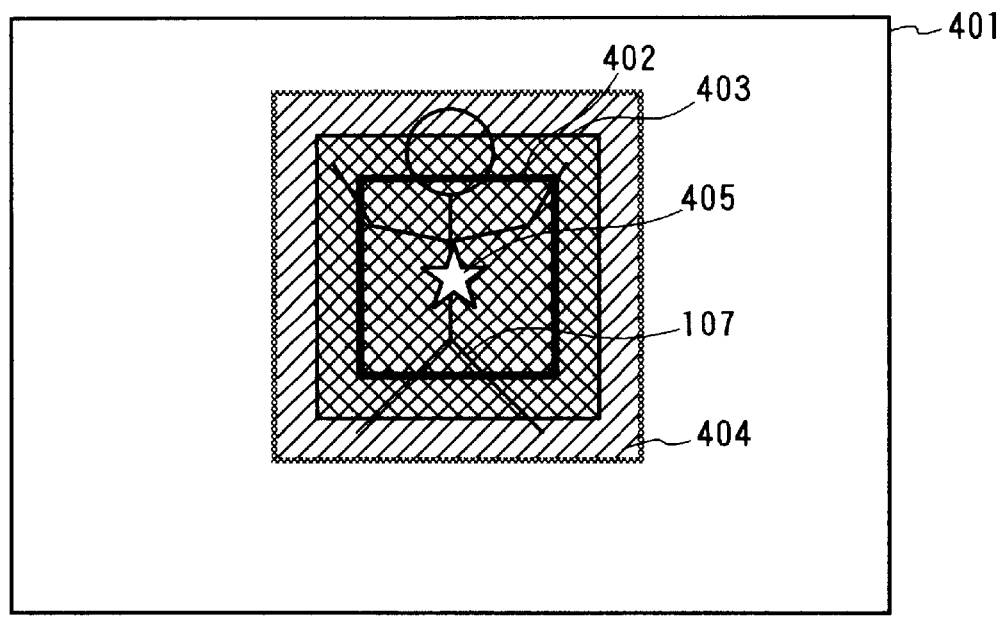
FIGS. 4A and 4B are explanatory views upon setting of a display frame, AF gate frame, and photometric gate frame.

The display frame generated by the display frame generation circuit 306, the AF gate frame generated by the AF gate frame generation circuit 307, and the AE gate frame generated by the AE gate frame generation circuit 308 will be explained below with reference to FIGS. 4A and 4B. FIG. 4A shows the setting state of the respective frames when the photographer gazes at a position near the center of the screen. A frame 401 corresponds to the outer frame of the screen. If the viewpoint of the photographer is assumed to be a position 405 indicated by a mark "★", a display frame 402, an AE gate frame 403 having an area slightly larger than that of the display frame 402, and an AF gate frame 404 having an area larger than that of the AE gate frame 403 are set to have the viewpoint 405 as their center. Although the display frame 402, the AE gate frame 403, and the AF gate frame 404 are set to have the viewpoint as their center, since their sizes are independently set, optimal areas for AE and AF operations can be set.

Figure 4B:
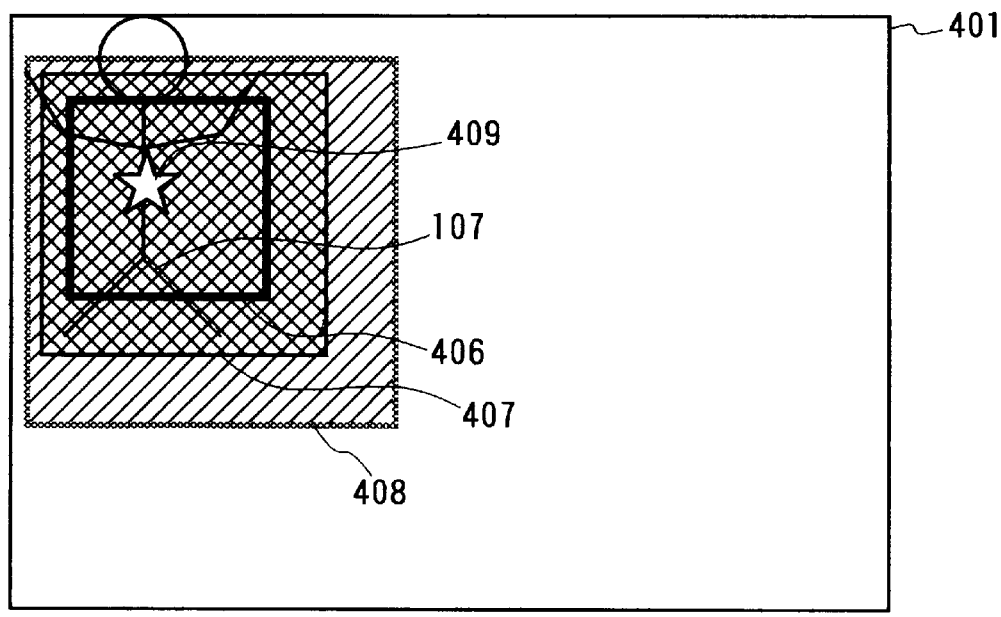

FIG. 4B shows the setting state of the respective frames when the viewpoint moves to one corner of the screen. If the viewpoint of the photographer at that time is assumed to be a position 409, an AE gate frame 407 having an area slightly larger than that of a display frame 406 and an AF gate frame 408 having an area larger than that of the frame 407 fall outside the outer frame 401 of the screen if they are set to have the viewpoint 409 as their center. For this reason, the frames 407 and 408 are clipped by the outer frame 401, so that the viewpoint 409 is offset from the centers of the frames. With this control, even when the viewpoint moves to the end of the screen or falls outside the frame, a stable operation can be continued while preventing the AE and AF operations from abruptly varying or becoming unstable. In this case, the setting position of the viewpoint 409 may be clipped to fall within the range in which the frame does not fall outside the screen. More specifically, when the actual viewpoint position corresponds to the end of the screen and falls outside the frame, the viewpoint detection result may be corrected, and the corrected result may be supplied to the microcomputer.

Figure 5:
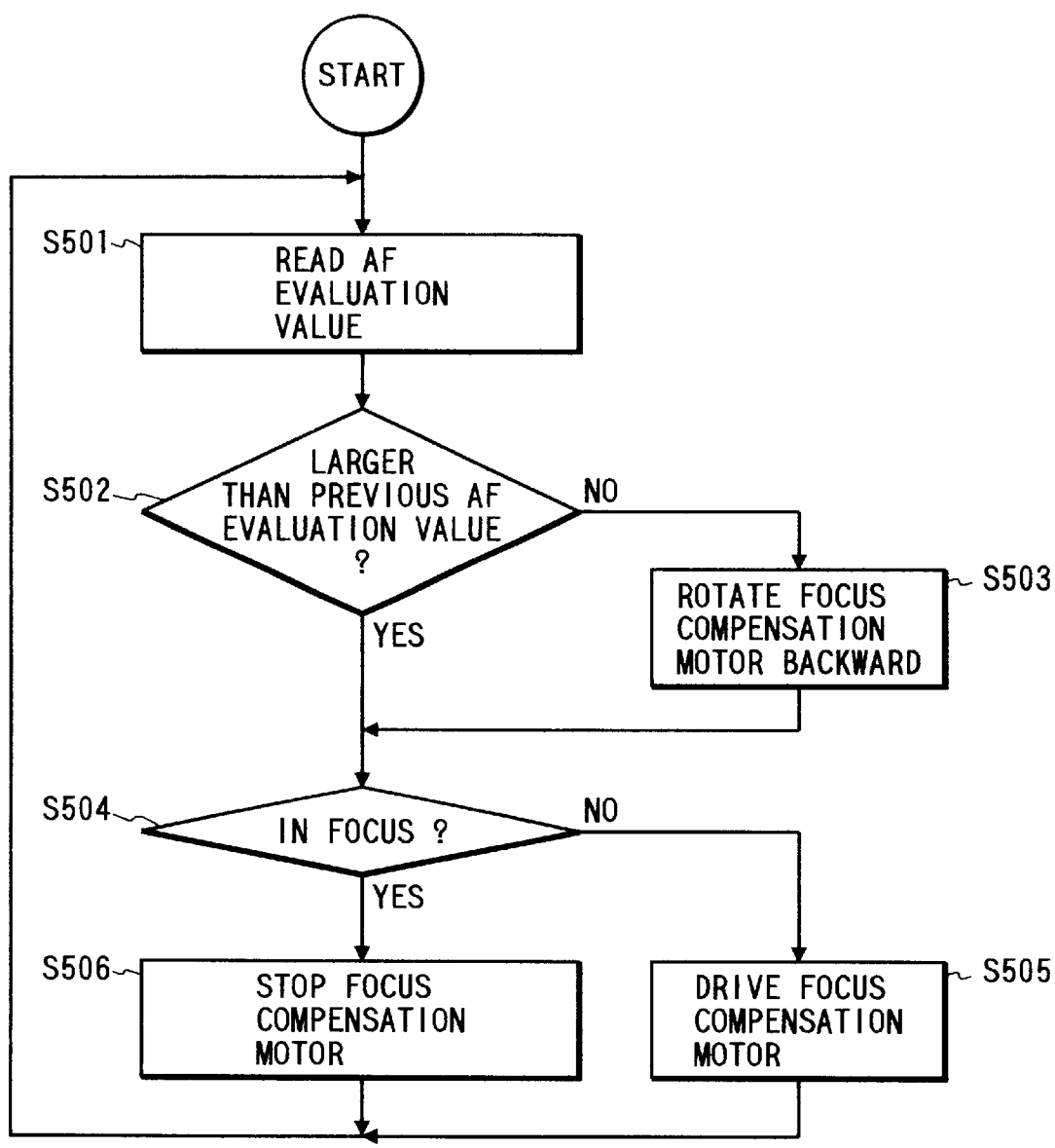
FIG. 5 is a flow chart showing the AF operation.

FIG. 5 is a flow chart of the AF operation.

The AF evaluation value is read from the AF evaluation value processing circuit 122 (step S501), and is compared with the previously read AF evaluation value (step S502). If the current evaluation value is smaller than the previous evaluation value, the focus compensation lens motor 125 is controlled to rotate backward so as to maximize the AF evaluation value (step S503). It is then checked if the motor has reached an in-focus point (if a maximum AF evaluation value is obtained) (step S504). If YES in step S504, the focus compensation lens motor 125 is stopped (step S506); otherwise, the focus compensation lens motor 125 is kept driven (step S505).

Figure 6:
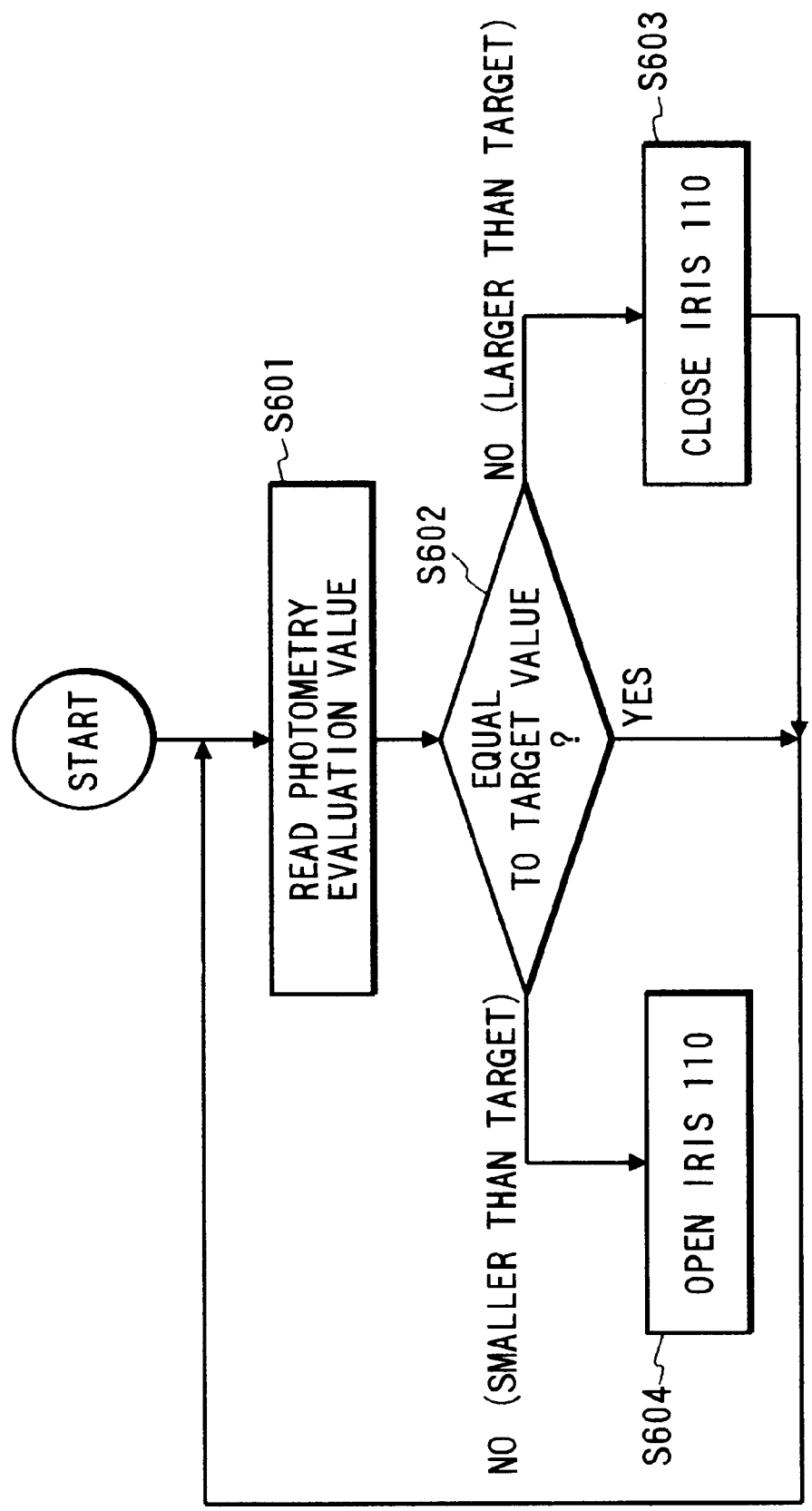
FIG. 6 is a flow chart showing the photometry operation.

FIG. 6 is a flow chart of the photometry operation.

The iris control circuit 119 reads a photometry evaluation value (step S601), and compares it with a predetermined target value (step S602). As a result of the comparison, if the photometry evaluation value is larger than the target value, the circuit 119 closes the iris 110 (step S603); otherwise, the circuit 119 opens the iris 110 (step S604), thus making control to obtain an optimal exposure value.

Figure 7:
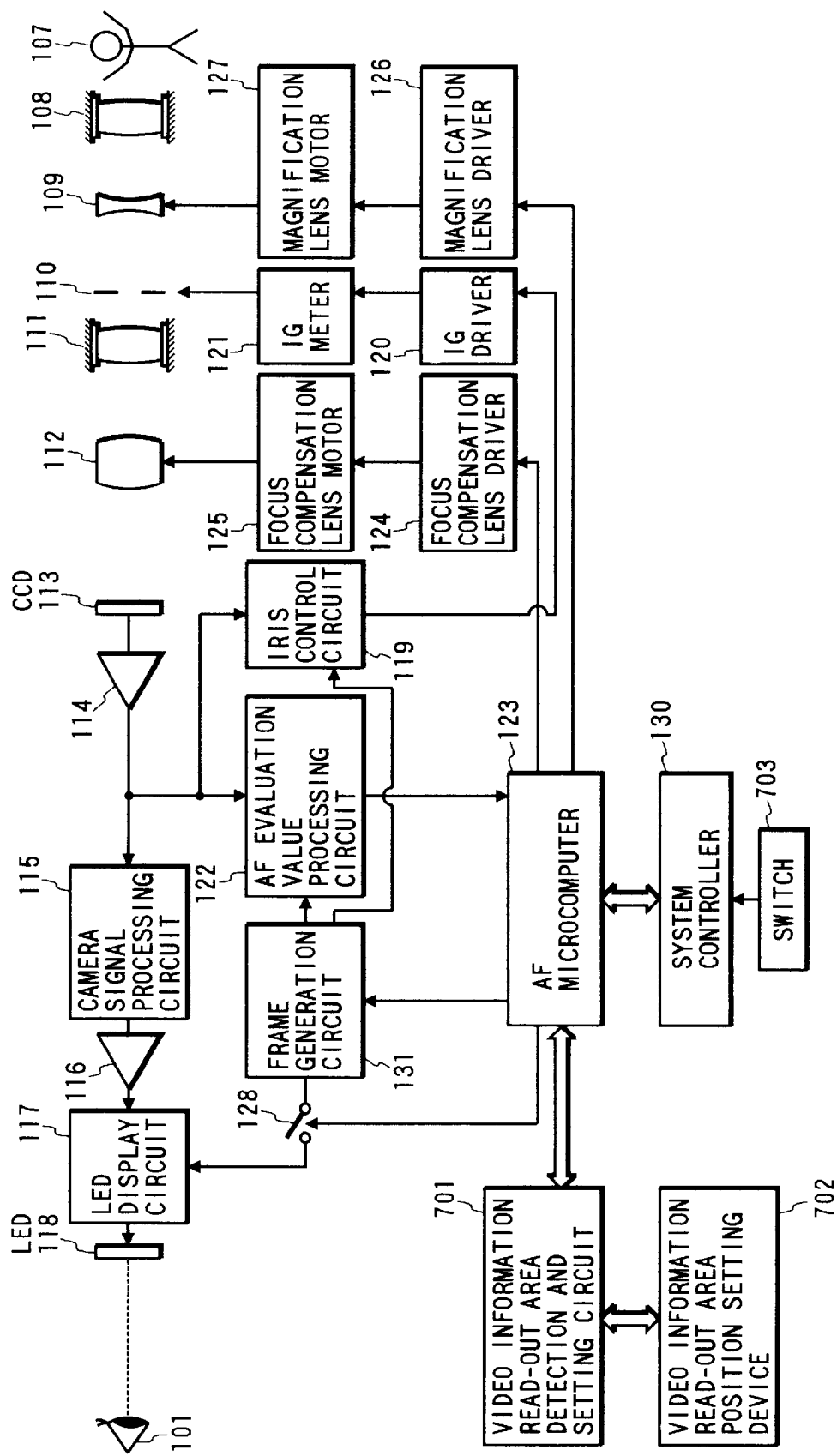
FIG. 7 is a block diagram showing the second embodiment of the present invention.

FIG. 7 is a block diagram showing the arrangement according to the second embodiment of the present invention. In this embodiment, a video information read-out area is determined using an external input means in place of the viewpoint input means.

A video information read-out area read by a video information read-out area position setting device 702 is processed by a video-information read-out area detection and setting circuit 701, and the processed area is sent to the microcomputer 123. In accordance with the status of a video information read-out area variable mode shift switch 703 read via the system controller 130, the microcomputer 123 determines whether or not the video information read-out area from the video information read-out area detection and setting circuit 701 is used, and sends position/size information of the respective frames to the frame generation circuit 131. Thereafter, the same control as in the first embodiment is performed.

The video information read-out area position setting device 702 may use, e.g., a keyboard, a mouse, a tracking ball, a joystick, a switch that can indicate the up, down, right, and left directions, or the like, which are popular as input devices of a computer, or may use a switch with higher direction resolution (e.g., 8 directions or 16 directions).

As described above, according to the above embodiments, in the externally input. position designated AE and AF method using, e.g., viewpoint detection, a joystick, or the like, optimal gate frames and areas for display of the designated position, and the AF and AE positions can be set, and the sizes and shapes of these areas can be independently set. For this reason, the AE and AF operations can be optimally controlled, and the focusing and exposure states can be appropriately adjusted with respect to a principal object by utilizing the features of the externally input position designated AE and AF methods using, e.g., viewpoint detection, a joystick, or the like.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:
    image pickup means for producing a video signal;
    position designation means for designating a position in a screen and for generating position information;
    first photometric gate means for movably setting a first photometric detection area in the screen at a first position determined in accordance with the position information designated by said position designation means, and for extracting a first signal, corresponding to the first photometric detection area, from the video signal produced by said image pickup means; and
    second photometric gate means for movably setting a second photometric detection area in the screen at a second position different from the first position determined in accordance with the position information designated by said position designation means regardless of the first position of the first photometric detection area set by said first photometric gate means, and for extracting a second signal having different components than the first signal, corresponding to the second photometric detection area, from the video signal produced by said image pickup means.

2. An apparatus according to claim 1, wherein said position designation means comprises detection means for detecting a viewpoint of a photographer on the screen.

3. An apparatus according to claim 2, further comprising:
    control means for controlling an exposure amount of said image pickup means on the basis of an output from said first photometric gate means; and
    second photometric control means for controlling a focus lens on the basis of an output from said focus gate means.

4. An apparatus according to claim 1, further comprising display means for displaying the position designated by said position designation means together with the video signal.

5. An apparatus according to claim 4, further comprising:

control means for controlling an exposure amount of said image pickup means on the basis of an output from said first photometric gate means; and second photometric control means for controlling a focus lens on the basis of an output from said focus gate means.

6. An apparatus according to claim 5, wherein said position designation means comprises detection means for detecting a viewpoint of a photographer who is observing said display means.

7. An apparatus according to claim 5, wherein said position designation means comprises switch means for selecting and designating a position on a display screen of said display means.

8. An apparatus according to claim 4, wherein said position designation means comprises detection means for detecting a viewpoint of a photographer who is observing said display means.

9. An apparatus according to claim 4, wherein said position designation means comprises switch means for selecting and designating a position on a display screen of said display means.

10. An apparatus according to claim 1, further comprising:

control means for controlling an exposure amount of said image pickup means on the basis of an output from said first photometric gate means; and focus control means for controlling a focus lens on the basis of an output from said second photometric gate means.

11. An apparatus according to claim 10, wherein said position designation means comprises detection means for detecting a viewpoint of a photographer on the screen.

12. An apparatus according to claim 11, wherein said position designation means comprises switch means for selecting and designating a position on a display screen.

13. An image pickup apparatus comprising:

image pickup means;

position designation means for designating an arbitrary position on a screen;

area setting means for setting on the screen a predetermined detection area to have the position designated by said position designation means; and control means for correcting said area setting means to move the predetermined detection area according to the position designated by said position designation means until a periphery of the predetermined detection area arrives to an end side of the screen and to inhibit movement of the predetermined detection area to an outside of the screen regardless of the position being designated in the screen by said position designation means after the periphery of the predetermined detection area arrives to the end side of the screen.

14. An apparatus according to claim 13, wherein said position designation means comprises viewpoint detection means for detecting a viewpoint of an operator in the screen.

15. An apparatus according to claim 13, wherein the detection area corresponds to a photometry area, and said apparatus further comprises photometry means for controlling an iris so that a level of an image pickup signal component corresponding to a portion inside the photometry area becomes constant.

16. An apparatus according to claim 15, wherein the detection area corresponds to a focus detection area, and said apparatus further comprises focus detection means for performing focus detection on the basis of a level of an image pickup signal component corresponding to a portion inside the focus detection area.

17. An apparatus according to claim 16, wherein said area setting means sets central positions of the focus detection area and the photometry area on the basis of an output from said position designation means, and independently sets sizes and shapes of the areas.

18. An image display apparatus comprising:

display means for displaying an image on a screen;

position, designation means for designating an arbitrary position in the screen;

area setting means for setting on the screen a predetermined image information read-out area at the position designated by said position designation means; and limiting means for controlling said area setting means to move the predetermined image information read-out area according to the position designated by said position designation means until a periphery of the predetermined image information read-out area arrives to an end side of the screen and to limit a movement of the predetermined image information read-out detection area to an outside of the screen regardless of the position being designated in the screen by said position designation means after the periphery of the predetermined image information read-out area arrives to the end side of the screen.

19. An apparatus according to claim 18, wherein said position designation means comprises viewpoint detection means for detecting a viewpoint of an operator in the screen.

20. An apparatus according to claim 18, wherein the image read-out area corresponds to a photometry area, and said apparatus further comprises photometry means for controlling an exposure state so that a level of a video signal component corresponding to a portion inside the photometry area becomes constant.

21. An apparatus according to claim 18, wherein the image read-out area corresponds to a focus detection area, and said apparatus further comprises focus detection means for performing focus detection on the basis of a level of an image pickup signal component corresponding to a portion inside the focus detection area.

22. An image processing apparatus comprising:

image receiving means;

position designation means for designating an arbitrary position in a screen;

area setting means for setting on the screen a predetermined image area at the position designated by said position designation means; and control means for controlling said area setting means to move the predetermined image area according to the position designated by said position designation means until a periphery of the predetermined image area arrives to an end side of the screen and to inhibit a movement of the predetermined image area to an outside of the screen regardless of the position being designated in the screen by said position designation means after the periphery of the predetermined image area arrives to the end side of the screen.

23. An apparatus according to claim 22, wherein said position designation means comprises viewpoint detection means for detecting a viewpoint of an operator in the screen.

24. An apparatus according to claim 22, wherein the predetermined image area corresponds to a photometry area, and said apparatus further comprises photometry means for controlling an iris so that a level of an image pickup signal component corresponding to a portion inside the photometry area becomes constant.

25. An apparatus according to claim 24, wherein the predetermined image area corresponds to a focus detection area, and said apparatus further comprises focus detection means for performing focus detection on the basis of a level of an image pickup signal component corresponding to a portion inside the focus detection area.

26. An apparatus according to claim 25, wherein said area setting means sets central positions of the focus detection area and the photometry area on the basis of an output from said position designation means, and independently sets sizes and shapes of the areas.

* * * * *

UNITED STATES PATENT AND TRADEMARK OFFICE
CERTIFICATE OF CORRECTION

PATENT NO.   : 6,473,127 B1
DATED        : October 29, 2002
INVENTOR(S)  : Hirofumi Suda It is certified that error appears in the above-identified patent and that said Letters Patent is hereby corrected as shown below:

Column 1,
Line 20, "Since-the" should read -- Since the --.

Column 3,
Line 63, "instruction." should read -- instruction --.

Column 6,
Line 14, "input." should read -- input --.
Line 62, "second photometric" should read -- focus --.
Line 63, "focus gate" should read -- second photometric gate --.

Column 7,
Line 5, "second photometric" should read -- focus --.
Line 6, "focus gate" should read -- second photometric gate --.

Column 8,
Line 11, "position," should read -- position --.

Signed and Sealed this

Twenty-fourth Day of June, 2003

JAMES E. ROGAN
*Director of the United States Patent and Trademark Office*